UNITED STATES PATENT OFFICE.

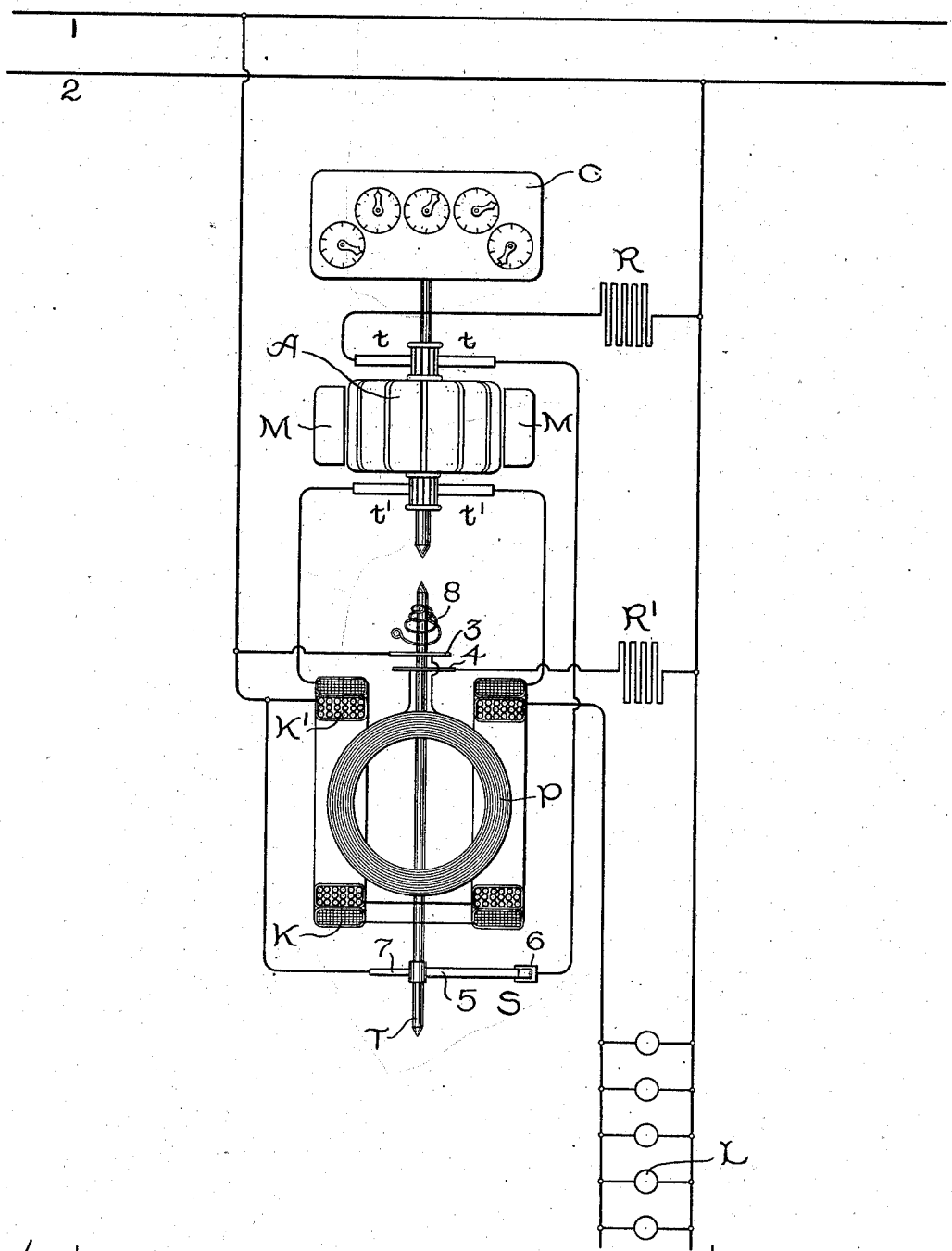

ELIHU THOMSON, OF SWAMPSCOTT, MASSACHUSETTS, ASSIGNOR TO GENERAL ELECTRIC COMPANY, A CORPORATION OF NEW YORK.

ELECTRIC METER.

SPECIFICATION forming part of Letters Patent No. 712,620, dated November 4, 1902.

Application filed July 27, 1898. Serial No. 687,007. (No model.)

*To all whom it may concern:*

Be it known that I, ELIHU THOMSON, a citizen of the United States, residing at Swampscott, in the county of Essex and State of Massachusetts, have invented certain new and useful Improvements in Electric Meters, (Case No. 878,) of which the following is a specification.

The present invention relates to an apparatus for measuring electric energy, and in the specific embodiment herein described it comprises a motor the speed of which is varied by intermittently applying energy thereto at such intervals as to maintain its speed proportional to the quantity to be measured. A counter registers the number of revolutions of the motor, and this furnishes a measure of the energy consumed.

The points of novelty of my invention will be set forth in the claims appended hereto, while its details and mode of operation will be made clear by reference to the following description.

The drawing represents one of the many embodiments which my invention may assume.

In the drawing, A represents the armature of a motor-generator, the shaft of which is mechanically geared to and drives the revolution-counter C. The supply-terminals $t\ t$ of the motor-generator are connected in shunt across the mains 1 2. If found necessary or desirable, a suitable resistance R may be included in this circuit to limit the flow of current. The magnetic field in which the armature A revolves is intended to remain constant, and this result is preferably obtained by the employment of a permanent magnet M, as shown in the drawing. Any other suitable means for accomplishing the same purpose may, however, be used.

It is evident that with a constant magnetic field and with a practically constant electromotive forced impressed upon the motor-terminals the speed of the armature A would ordinarily remain constant. In order to vary the speed, however, a switch S is interposed in the motor-supply circuit, and this switch is arranged to remain open at intervals so timed as to reduce the speed of the motor to practical proportionality to the current in the work-circuit. The switch-controlling device is like a differentially-wound ammeter and consists of a fixed and a movable member. As I prefer to construct it the fixed member is composed of two coils K K'. The coil K' is in series with the work-circuit, which in this case is shown as feeding lamps L. The coil K is in series with the secondary winding on the armature A of the motor-generator and is connected therewith through the terminals $t'\ t'$. It is obvious that this secondary winding might be replaced in function by a separate generator whose electromotive force is proportional to the speed of the armature A or, indeed, by any other source of electromotive force having the same proportionality. The movable coil P is shunted across the supply-mains 1 2, and, if desired, a resistance R' may be interposed to prevent too great a flow of current. As shown in the drawing, the movable coil is mounted on a rotatable shaft T, and connections are made with the terminals of the coil in any suitable manner—as, for instance, through oppositely-wound spiral springs 3 4. Carried by the shaft T is a switch-arm 5, which makes contact with the switch-plate 6. Current is conveyed to the arm 5 by means of the brush 7, bearing on the shaft T. Any other suitable circuit-closing device may be employed, the one illustrated being shown merely as an example of one of the many possible constructions. A spring 8 maintains the switch S normally open. The coil P is arranged to be dynamically acted upon by current in the coils K K'. The coils K K' are, however, so connected that the currents therein act in opposition to each other. It is evident, therefore, that when the torque exerted by the current in coil K is insufficient to neutralize the torque due to current in K' the switch S will be closed and that when a condition of equality is reached the spring 8 will cause the switch S to open.

The mode of operation is as follows: When current passes through the series coil K' to the lamps L or other translating devices, a torque is exerted between that coil and the movable coil P and the switch S is closed. As soon as the switch S is closed current passes to the armature A of the motor-generator, which thereupon commences to revolve. The voltage at the generator-terminals $t'$ $t'$ rises directly with the speed until the current passing in the coil K is sufficient to balance the torque produced by current in the series coil K'. The switch S then opens and the motor-generator slows down, thus lessening the current in the coil K. The current in the series coil K' then overpowers that in the coil K, and the switch S closes. The motor-generator then speeds up until a condition of balance is reached, and the switch again opens. This operation is repeated indefinitely and with a rapidity dependent upon the proportioning of parts and the delicacy of adjustment. For every different current passing in the series coil K' it is evident that a proportionate amount of current in the coil K will be required to neutralize its effect. Since the speed of the motor-generator is proportional to the current flowing in the coil K, it follows that the number of revolutions registered by the counter C in a given time is proportional to the amount of current flowing in the work-circuit in the same time. The counter, therefore, reads in ampere hours or the equivalent when the potential difference between the mains is constant or varying.

What I claim as new, and desire to secure by Letters Patent of the United States, is—

1. In an electric meter, the combination of a motor-generator, and means, controlled by the current generated thereby, for opening the supply-circuit of the motor-generator when its armature reaches a rate of rotation corresponding to the energy to be measured.

2. A motor-generator having a permanent magnetic field, a circuit of constant resistance connected to its generator-terminals, and means for intermittently supplying current to the motor element of the motor-generator.

3. In a measuring instrument, the combination of a circuit-closing device having separate coils in fixed relation to each other and a third coil with limited movement relatively thereto, with means for sending currents through all the coils.

4. The combination of a motor-generator, a switch for closing the supply-circuit of the motor-generator, a switch-actuating device having three coils, one of which is relatively movable with respect to the other two, and means for supplying current generated by the motor-generator to one of said coils.

5. In an electric meter, the combination of a motor-generator, a switch in the supply-circuit of said motor-generator, and a switch-closing device having two relatively movable members.

6. In an electric meter, the combination of a motor-generator, a switch in the supply-circuit of said motor-generator, and a switch-closing device having two relatively movable members the torque between which is the resultant of the differential action of two currents in one member upon a current in the other member.

7. In an electric meter, the combination of a motor-generator, a switch in the supply-circuit of said motor-generator, a switch-closing device having two relatively movable members, one of which consists of two coils, one in series with the work-circuit, the other supplied with current from the motor-generator and a coil comprising the other member of the switch-closing device and fed with an approximately constant current.

8. In an electric meter, the combination of a motor-generator, a switch for closing the supply-circuit of the motor-generator, and a switch-controlling device, consisting of two relatively movable members, one of which is adapted to be acted upon dynamically by two mutually-opposing currents in the other member, one of which currents is proportional to the energy to be measured, the other to the speed of said motor-generator.

9. In an electric meter, the combination of a device for producing an electromotive force, a switch for controlling said device, and means controlled by said electromotive force for operating said switch.

10. In an electric meter, the combination of a motor-generator, a controlling-switch therefor, and a switch-closing device having relatively movable members.

11. A motor-generator having a substantially constant magnetic field, and means for regulating its speed by intermittently supplying current to its motor element.

12. The combination of a motor-generator, a switch for controlling the motor-generator, a switch-actuating device having relatively movable coils, and means for impressing upon the circuit of one of the coils an electromotive force produced by the motor-generator.

13. In an electric meter, the combination of a motor-generator, and means controlled by electromotive force generated thereby for opening the supply-circuit of the motor-generator when the motor-generator reaches a speed corresponding to the quantity to be measured.

In testimony whereof I have hereunto set my hand this 20th day of July, 1898.

ELIHU THOMSON.

Witnesses:
 HENRY O. WESTENDARP,
 DUGALD MCKILLOP.